United States Patent
Sperka et al.

[15] 3,658,471
[45] Apr. 25, 1972

[54] PROCESS FOR THE PRODUCTION OF HYDROCYANIC ACID AND HYDROGEN FROM ACETONITRILE AND AMMONIA

[72] Inventors: Gerhard Sperka, Litzelstetten; Walter Neugebauer, Constance, both of Germany

[73] Assignee: Deutsche Gold-und Silber-Scheideanstalt vormals Roessler, Frankfurt (Main), Germany

[22] Filed: June 13, 1969

[21] Appl. No.: 833,159

[30] Foreign Application Priority Data

July 6, 1968 Germany.................P 17 67 974.2-41

[52] U.S. Cl. .............................................23/151, 23/212 R
[51] Int. Cl. .........................................C01c 3/00, C01b 1/02
[58] Field of Search..........................................23/151, 212 R

[56] References Cited

UNITED STATES PATENTS 3,028,413 4/1962 Fierce et al. ...........................23/212

FOREIGN PATENTS OR APPLICATIONS 211,575 5/1956 Australia ................................23/151
538,590 3/1957 Canada..................................23/151
1,022,638 3/1966 Great Britain

*Primary Examiner*—Oscar R. Vertiz
*Assistant Examiner*—Hoke S. Miller
*Attorney*—Cushman, Darby & Cushman

[57] ABSTRACT

Hydrogen cyanide and hydrogen are prepared from acetonitrile and ammonia using a platinum group metal catalyst at 1,100°–1,400° C., and quenching to below 500° C. Preferably aluminum or magnesium or oxide or nitride thereof is also employed.

10 Claims, No Drawings

PROCESS FOR THE PRODUCTION OF HYDROCYANIC ACID AND HYDROGEN FROM ACETONITRILE AND AMMONIA

The large scale production of hydrogen cyanide results from the reaction of ammonia with methane at high temperatures. The necessary reaction heat is produced through addition of air to the inserted gas with partial burning of methane and ammonia or through external heating of the reaction space (contact tubes).

Now there accumulates acetonitrile in the production of acrylonitrile from propylene, ammonia and air as an undesired byproduct. It is already known to change acetonitrile into hydrocyanic acid through treatment with hydrogen in the gas phase at temperatures of 600°–850° C., preferably about 700° C. (British patent 1,051,404). In this process, which is carried out without catalyst, however, only a part of the carbon present in the molecule is converted into hydrogen cyanide. The methyl radical leads to byproducts. Furthermore it is known that acetonitrile is converted to hydrocyanic acid with air under the addition of steam catalytically at 300° to 700° C. e.g., 500° C. (German patent 1,146,861). Also thereby only the cyanide part of the acetonitrile is utilized. The hydrocyanic acid accumulates as a strongly diluted gas, which moreover is contaminated by the byproducts arising from the methyl group of the acetonitrile.

Similar results are obtained following the process of German Auslegeschrift 1,203,241. In that process acetonitrile is catalytically reacted with ammonia with addition of air or nitrogen at temperatures of 600° to 850° C. and thereby HCN yields up to 158 percent based on the added acetonitrile are attained (theoretical yield by complete conversion of 1 mole of acetonitrile with ammonia into 2 moles hydrocyanic acid amounts to 200 percent). The residue of the added acetonitrile was partially decomposed to byproducts, partially recovered undecomposed in the end product.

Furthermore according to a Japanese article (Ozaki et al., Intern. Chem. Eng. 5 (1967), page 580 et seq.) acetonitrile, ammonia and nitrogen were brought to reaction at 700° to 900° C. in the presence of platinum and aluminum oxide. The thereby maximum yield of 150 percent obtained (compared to 200 percent theory) was obtained by mixing in with the inserted gas oxygen as a reaction trigger, without oxygen in comparison amounted the yield at most to 130 percent. It can be seen thereby that by the oxidative method of production a series of byproducts is formed, the reaction gas is in all described examples strongly diluted, since it always is operated with a many fold excess of nitrogen ($CH_3CN : NH_3 : N_2 = 1:1:6$). From the investigations it appears that to 800° C. there is a mounting of the hydrogen cyanide yield, over 800° C. in comparison practically no improvement was observed.

In all of these processes the hydrogen cyanide content in the product gas is relatively small. Besides the working up of the product gas is made difficult because of the presence of the decomposition products and the unchanged acetonitrile and requires additional apparatus and operating costs for the recovery of pure hydrogen cyanide.

It has now been found that acetonitrile and ammonia can be converted to hydrogen cyanide and hydrogen in almost quantitative yield if a gaseous mixture of acetonitrile and ammonia is quickly heated to temperatures of 1,100° to 1,400° C., reacted at this temperature in the presence of a platinum metal catalyst and then the gaseous reaction mixture in leaving the reaction space quickly chilled to temperatures below 500° C.

The heating of the starting material as well as the chilling of the reaction mixture should take place quickly. The favorable range is 0.001 to 0.01 second and the maximum time is 0.1 second. The quick heating can take place by intensive heating of contact tubes in the gas entrance, i.e., in the lowest oven zone.

For chilling known processes are also used, for example, indirect intensive cooling with coil condensers.

As platinum catalysts there can be employed pure metal catalysts of the platinum group of the periodic table as well as mixed platinum group catalysts. They are known in themselves and have been used for the synthesis of hydrocyanic acid from methane and ammonia (German patents 919,768 and 919,769). The catalysts can consist of pure platinum metals, as for example platinum, ruthenium, palladium, iridium, rhodium, osmium or their mixtures, e.g. platinum-ruthenium containing 5%, 8%, 10%, 12.5% or 20% ruthenium, platinum-iridium containing 0.3%, 10% or 25% iridium, platinum-rhodium containing 3.5%, 10% or 20% rhodium, platinum-palladium containing 5%, 10% or 15% palladium, palladium-ruthenium containing 2% or 4,5% ruthenium, osmium-platinum containing 85% osmium. Especially advantageous, however, have proven to be the platinum mixed catalysts which besides platinum and/or other platinum group metals also contain aluminum and/or magnesium in a content up to 90 atom percent, preferably 50 to 80 atom percent. The production of such catalysts is described in German patent 1,013,636 and there can be employed any of the catalysts disclosed in that patent. Aluminum and magnesium can be present as an intermetallic phase or in the form of an oxide or nitride with the platinum metal concerned. Thus there can be used metallic aluminum or magnesium or aluminum oxide, magnesium oxide, aluminum nitride or magnesium nitride. For example, there can be used a mixture of platinum with aluminum, magnesium or aluminum oxide containing 90 atom percent of aluminum or magnesium based on the total atoms of platinum and aluminum or magnesium or there can be used platinum, palladium or ruthenium with aluminum, magnesium, aluminum oxide, magnesium oxide, aluminum nitride or magnesium nitride containing either 50 atom percent or 80 atom percent of aluminum or magnesium based on the total atoms of the platinum group metal and the aluminum or magnesium.

Further examples of suitable catalysts include 60% platinum, 8% ruthenium and 32% aluminum (with at least 60% of the latter being present as aluminum nitride.

The aluminum or magnesium or oxide or nitride thereof can be employed in any desired amount less than 50 atoms percent with a reduction in advantage over the use of platinum group metal alone.

Suitably the catalyst is set on a fireproof carrier, as for example thorium oxide, zirconium oxide, silicon carbide, and silicon dioxide. Thus, for example in an illustrative form of the claimed process the catalyst is set up on the inner wall of aluminum oxide tubes in the form of a thin layer. Heating of the tubes can be accomplished with electricity or gas.

The contact time in the reactor as stated is short. It can be between 0.5 and 0.01 second.

The proportions of both reactants (acetonitrile and ammonia) is variable in a wide range. As an economic expediency one employs approximately the molar proportions 1:1, preferably with a slight ammonia excess, for example 1.05:1. The only disadvantage of using large excess of either reactant is the fact that the unreacted material must be separated from the desired product and recovered. In Example 4 the molar ratio of ammonia to acetonitrile is 8:7.2 or approximately 1.1:1.

In contrast to the opinion of Ozaki (loc. cit.) it has been found as set forth above that a temperature above 800° C. is necessary for high conversion. There is used a temperature between 1,100° and 1400° C., preferably between 1,100° and 1,300° C.

The initial mixture of acetonitrile and ammonia should be as free as possible from air or oxygen, since oxygen reduces the yield of hydrogen cyanide.

The advantage of this process of the invention in contrast to the state of the art lies in a practically quantitative conversion of the acetonitrile introduced into hydrogen cyanide. Since, moreover, undiluted acetonitrile and ammonia can be introduced and since decomposition products are missing after separation of the hydrogen cyanide and the small amount of unchanged ammonia there is obtained a residue gas which consists of nearly pure hydrogen.

That such high conversion and yield, i.e., up to almost 100 percent reaction of acetonitrile with ammonia at the specified high temperature can be obtained is surprising since these materials, especially acetonitrile, in this temperature range are quickly and extensively decomposed.

A further advantage of the invention besides the quantitative running of the reaction is seen in that, as already mentioned, besides the reaction partners acetonitrile and ammonia, no additional gases such as, for example, steam, nitrogen and air must be added, whereby a high space-time yield is attained in the reactor. Besides moderate heat, it is advantageous that there is also a very high concentration of hydrocyanic acid in the product gas which is worked up to liquid hydrocyanic acid as well as to form subsequent product more simply and cheaply than by previously known process. For example, hydrogen cyanide concentrations up to 48 volume percent are found in the product gas. On the other hand it is also possible to work with a diluted charging gas so far as this is necessary. After working up the product gas a hydrocyanic acid is obtained which shows a purity of over 99 percent.

Besides, as has been mentioned, hydrogen is obtained as a second product after the hydrogen cyanide and the non-reacted ammonia are separated off. The thus obtained hydrogen has a content of 97 volume percent hydrogen. The residue consists of nitrogen and methane. On account of its great purity this gas can be used not only for heating but also for synthetic purposes. Hydrogen cyanide and ammonia are separated by known processes, for example the unreacted ammonia portion can be absorbed in sulfuric acid and the hydrogen cyanide separated through a cool wash. The resulting hydrogen cyanide containing solution then was fractionally distilled.

EXAMPLE 1

In a tube of highly sintered alumina having the inner wall impregnated with a platinum-aluminum contact mixture ( 36 atom percent platinum and 64 atom percent aluminum) there were admitted hourly a gas stream consisting of 6.3 moles of ammonia and 6.0 moles of acetonitrile. Inside the contact tube prevailed a temperature having a maximum of 1,220° C. After a contact time of 0.16 second the gas having the contact space was quenched to a temperature below 300° C. It had a composition of 47.3 mole percent HCN, 1.1 mole percent $NH_3$, 0.8 mole percent $N_2$, 0.9 mole percent $CH_4$, 0.04 mole percent $CH_3CN$ and 49.9 mole percent $H_2$. Of the inserted acetonitrile therefore 0.2 percent had not reacted. At an hourly production of 11.7 mole of HCN the yield of HCN amounted to 94.7 percent based on the added nitrogen (from the $NH_3$ and the $CH_3CH$) while on the added carbon (from the $CH_3CN$) it amounted to 97.9 percent. The residue gas consisted of 96.7 volume percent hydrogen, 1.8 percent methane and 1.5 percent nitrogen.

EXAMPLE 2

In an $Al_2O_3$ tube heated to a maximum of 1,120° C. and coated on the inside with platinum 4.0 moles of ammonia and 3.8 moles of acetonitrile were reacted for 0.4 second. The reaction mixture was then quenched to 300° C. There were obtained 7.2 moles of HCN, corresponding to a yield of 92.0 percent based on the total nitrogen or 94.6 percent based on the total carbon added. The acetonitrile conversion mounted to 99.4 percent. The product gas contained 47.7 mole percent HCN, the residue gas 94.2 volume percent $H_2$.

EXAMPLE 3

6.1 moles of ammonia and 5.5 moles of acetonitrile were brought to reaction at a contact tube inner temperature having a maximum of 1,380 C. for 0.08 second. As the catalyst there served a contact mixture of Pt-Pd-Al ( 29 atom percent Pt, 3 atom percent Pd and 68 atom percent Al). After quenching to about 250° C. a HCN yield of 93.0 percent was obtained based on the nitrogen and 98.6 percent based on the carbon, and a $CH_3CN$ reaction of 99.9 percent. There were produced 10.9 moles of hydrogen cyanide which was 47.0 mole percent of the product gas. The HCN and $NH_3$ free residual gas contained 96.4 volume percent $H_2$.

EXAMPLE 4

Using a Pt-Al contact catalyst ( 33 atom percent Pt and 67 atom percent Al) at a maximum temperature of 1,350° C. for 0.015 seconds there were reacted 8.0 moles of ammonia and 7.2 moles of acetonitrile. The reaction gas was cooled to 490° C. 13.1 mole of HCN were obtained.

EXAMPLE 5

4.7 moles of ammonia and 4.5 moles of acetonitrile were brought to reaction at 1,200° C. for 0.2 seconds using a Pt-Al ( 33 atom percent Pt and 67 atom percent Al) contact catalyst. The product gas was quenched on leaving the reaction space to about 120° C. The HCN production amounted to 8.8 moles.

What is claimed is:

1. In a process for the production of hydrogen cyanide and hydrogen from acetonitrile and ammonia in the presence of a catalyst of the platinum group of metals the improvement comprising heating a gaseous mixture consisting essentially of acetonitrile and ammonia quickly to a temperature of 1,100° to 1,400° C. and reacting at this temperature in the presence of the catalyst and quickly cooling the reaction gas leaving the reaction space to a temperature below 500° C.

2. A process according to claim 1 wherein the catalyst also includes aluminum, magnesium, aluminum oxide, aluminum nitride, magnesium oxide or magnesium nitride.

3. A process according to claim 2 wherein the catalyst is a platinum metal mixed catalyst containing 50 to 90 atom percent aluminum or magnesium.

4. A process according to claim 3 wherein the platinum metal is platinum itself.

5. A process according to claim 3 wherein the catalyst is employed on an aluminum oxide carrier.

6. A process according to claim 1 wherein the reaction is carried out in a reaction zone the wall of which comprises highly sintered alumina.

7. A process according to claim 5 wherein the catalyst coats the inner wall of the reaction zone.

8. A process according to claim 1 wherein the reaction is carried out for a time of 0.5 to 0.01 second.

9. A process according to claim 1 wherein the molar ratio of ammonia to acetonitrile is between 1:1 and 1.1:1 and the products formed consist essentially of hydrogen cyanide and hydrogen.

10. A process according to claim 9 wherein the reaction is carried out for a time of 0.5 to 0.01 second.

* * * * *